United States Patent
Oh

(10) Patent No.: US 11,112,631 B2
(45) Date of Patent: Sep. 7, 2021

(54) LIQUID CRYSTAL DISPLAY

(71) Applicant: LG Display Co., Ltd., Seoul (KR)

(72) Inventor: Guentaek Oh, Paju-si (KR)

(73) Assignee: LG DISPLAY CO., LTD., Seoul (KR)

(*) Notice: Subject to any disclaimer, the term of this patent is extended or adjusted under 35 U.S.C. 154(b) by 0 days.

(21) Appl. No.: 16/008,433

(22) Filed: Jun. 14, 2018

(65) Prior Publication Data

US 2018/0364517 A1 Dec. 20, 2018

(30) Foreign Application Priority Data

Jun. 15, 2017 (KR) .................. 10-2017-0076049

(51) Int. Cl.
*G02F 1/1333* (2006.01)
*G02F 1/1335* (2006.01)
*G02F 1/13357* (2006.01)

(52) U.S. Cl.
CPC .. *G02F 1/133308* (2013.01); *G02F 1/133524* (2013.01); *G02F 1/133606* (2013.01); *G02F 1/133608* (2013.01); *G02F 1/133314* (2021.01); *G02F 1/133317* (2021.01); *G02F 1/133604* (2013.01); *G02F 2201/465* (2013.01)

(58) Field of Classification Search
None
See application file for complete search history.

(56) References Cited

U.S. PATENT DOCUMENTS

| 8,814,414 | B2* | 8/2014 | Hsu .................. G02F 1/133308 |
| | | | 362/611 |
| 9,261,721 | B2* | 2/2016 | Kuk ...................... G02F 1/1336 |
| 9,551,826 | B2* | 1/2017 | Li .......................... G02B 6/009 |
| 9,759,950 | B2* | 9/2017 | Kim ...................... G02F 1/1339 |
| 9,766,487 | B2  | 9/2017 | Liu |
| 9,766,488 | B2  | 9/2017 | Nishi et al. |
| 10,120,224 | B2* | 11/2018 | Lee ....................... H05K 999/99 |
| 10,527,877 | B2* | 1/2020 | Ochi ................... H04M 1/0266 |
| 2002/0001184 | A1* | 1/2002 | Kim ..................... G02B 6/0091 |
| | | | 362/633 |

(Continued)

FOREIGN PATENT DOCUMENTS

| CN | 202615076 U | * 12/2012 | ............... G02F 1/13 |
| CN | 202615076 U | 12/2012 | |

(Continued)

*Primary Examiner* — Edward J Glick
*Assistant Examiner* — Anthony G Quash
(74) *Attorney, Agent, or Firm* — Seed IP Law Group LLP

(57) ABSTRACT

A liquid crystal display includes a guide panel configured to guide a position of a liquid crystal display panel and a backlight unit, a cover bottom, and a rear cover. The guide panel includes a panel supporter extended in a first direction and including a second groove, and an extension extended from the panel supporter in a second direction intersecting the first direction and including a first groove. The cover bottom includes a horizontal portion extended in the first direction, and a vertical portion extended from the horizontal portion in the second direction. One end of the vertical portion is inserted into the second groove. The rear cover includes a body covering a back surface of the horizontal portion, and a hook protruding from the body in the first direction and inserted into the first groove.

19 Claims, 6 Drawing Sheets

(56) References Cited

U.S. PATENT DOCUMENTS

| | | | | |
|---|---|---|---|---|
| 2006/0290836 A1* | 12/2006 | Chang | ................ | G02B 6/0088 349/58 |
| 2011/0141389 A1* | 6/2011 | Tabor | ................ | G02F 1/133308 349/58 |
| 2012/0268686 A1* | 10/2012 | Lee | ................ | G02F 1/13452 349/59 |
| 2012/0268868 A1* | 10/2012 | Yoon | ................ | G02F 1/133308 361/679.01 |
| 2012/0281383 A1* | 11/2012 | Hwang | ................ | G02B 30/25 361/807 |
| 2013/0114003 A1* | 5/2013 | Tanaka | ................ | G02F 1/133308 348/836 |
| 2013/0114018 A1* | 5/2013 | Kim | ................ | G02F 1/133308 349/58 |
| 2013/0155585 A1* | 6/2013 | Kim | ................ | G02F 1/133308 361/679.01 |
| 2013/0235302 A1* | 9/2013 | Jeon | ................ | G02F 1/133308 349/64 |
| 2013/0236680 A1* | 9/2013 | Ahn | ................ | G02F 1/133308 428/68 |
| 2013/0308074 A1* | 11/2013 | Park | ................ | G02F 1/133308 349/58 |
| 2014/0002969 A1* | 1/2014 | Hwang | ................ | G06F 1/1637 361/679.01 |
| 2014/0204293 A1* | 7/2014 | Kim | ................ | G02F 1/133351 349/15 |
| 2015/0181656 A1* | 6/2015 | Bang | ................ | G02F 1/133308 313/512 |
| 2016/0187710 A1* | 6/2016 | An | ................ | G02F 1/133308 349/58 |
| 2016/0349568 A1* | 12/2016 | Oh | ................ | G02B 6/0088 |
| 2017/0123260 A1* | 5/2017 | Kim | ................ | G02F 1/133308 |
| 2017/0146850 A1* | 5/2017 | Lee | ................ | G02F 1/133308 |
| 2017/0192163 A1* | 7/2017 | Oh | ................ | G02B 6/0088 |
| 2017/0261804 A1* | 9/2017 | Zhao | ................ | G02F 1/133308 |
| 2017/0363798 A1* | 12/2017 | Hirayama | ................ | G02F 1/1368 |
| 2018/0154569 A1* | 6/2018 | Ha | ................ | B29C 48/07 |
| 2019/0049773 A1* | 2/2019 | Woo | ................ | G09G 3/34 |

FOREIGN PATENT DOCUMENTS

| | | | | |
|---|---|---|---|---|
| CN | 102865525 A | 1/2013 | | |
| CN | 203630469 U | 6/2014 | | |
| CN | 204009290 U | 12/2014 | | |
| CN | 104516143 A | 4/2015 | | |
| CN | 104685410 A | 6/2015 | | |
| CN | 204389848 U | 6/2015 | | |
| CN | 106151972 A | 11/2016 | | |
| CN | 106200116 A | 12/2016 | | |
| CN | 205787467 U | * 12/2016 | ........... | G02F 1/1333 |
| CN | 205787467 U | 12/2016 | | |
| CN | 205982917 U | * 2/2017 | ........... | G02F 1/1333 |
| CN | 205982917 U | 2/2017 | | |
| CN | 106707592 A | 5/2017 | | |
| KR | 10-2017-0014400 A | 2/2017 | | |
| KR | 20170014400 A | * 2/2017 | ........... | G02F 1/1333 |
| KR | 10-2017-0025926 A | 3/2017 | | |
| TW | I284227 B | 7/2007 | | |

\* cited by examiner

LIQUID CRYSTAL DISPLAY

CROSS-REFERENCE TO RELATED APPLICATION(S)

This application claims the priority benefit of Korean Patent Application No. 10-2017-0076049 filed on Jun. 15, 2017, which is incorporated herein by reference for all purposes as if fully set forth herein.

BACKGROUND

Technical Field

The present disclosure relates to a liquid crystal display including a backlight unit.

Description of the Related Art

Liquid crystal displays have been applied to portable computers such as notebook PCs, office automation devices, audio/video devices, advertising display devices for indoor or outdoor uses, and so on. The liquid crystal display controls an electric field applied to a liquid crystal layer of a liquid crystal display panel and modulates light provided by a backlight unit, thereby displaying an image.

The backlight unit may be classified as an edge type backlight unit and a direct type backlight unit. The edge type backlight unit is configured such that light sources are positioned opposite a light guide plate, and a plurality of optical sheets is positioned between the liquid crystal display panel and the light guide plate. In the edge type backlight unit, the light sources irradiate light onto one side of the light guide plate, and the light guide plate converts a line light source or a point light source into a surface light source and irradiates light onto the liquid crystal display panel. The direct type backlight unit is configured such that light sources are positioned under the liquid crystal display panel. The direct type backlight unit irradiates light diffused by a diffuser plate onto the liquid crystal display panel.

The liquid crystal display panel and the backlight unit are assembled with case members for fixing them to form a liquid crystal module. The case members may include a guide panel, a cover bottom, a case top, and the like. The liquid crystal module is accommodated in an inner space of a set component such as a rear cover and a middle frame and is implemented as a liquid crystal display.

Because a related art liquid crystal display includes many components as described above, it is difficult to design lightweight and thin liquid crystal displays in a related art. Further, the related art liquid crystal displays have a difficulty in implementing various designs. As a result, it is difficult to apply the related art liquid crystal displays to various fields.

BRIEF SUMMARY

The present disclosure provides various embodiments which address the above-described and other problems and provide a liquid crystal display including a guide panel and a rear cover as appearance components.

In one embodiment, there is provided a liquid crystal display comprising a guide panel configured to guide a position of a liquid crystal display panel and a backlight unit, a cover bottom, and a rear cover, wherein the guide panel includes a panel supporter extended in a first direction, the panel supporter including a second groove formed by depressing a portion of an inner surface of the panel supporter in a second direction intersecting the first direction, and an extension extended from the panel supporter in the second direction, the extension including a first groove formed by depressing a portion of an inner surface of the extension in the first direction, wherein the cover bottom includes a horizontal portion extended in the first direction, and a vertical portion extended from the horizontal portion in the second direction, one end of the vertical portion being inserted into the second groove. The rear cover includes a body covering a back surface of the horizontal portion of the cover bottom, and a hook protruding from the body in the first direction and inserted into the first groove.

The extension and the rear cover may be configured as appearance components and are exposed to the outside. The cover bottom may be positioned on an inner surface of the rear cover.

One end of the extension may protrude in a rearward direction beyond the back surface of the horizontal portion of the cover bottom.

The first groove may be provided at the protruding end of the extension.

The rear cover may be made of a plastic material.

A portion of the panel supporter including the second groove may have a predetermined thickness. A portion of the extension including the first groove may have a predetermined thickness.

The horizontal portion of the cover bottom may include a stopper protruding toward the rear cover in the second direction. The rear cover may further include a stopper groove into which the stopper is inserted. The stopper groove may be formed by depressing a portion of the rear cover in the second direction.

In another embodiment, the present disclosure provides a display device that includes a guide panel, a rear cover, and a cover bottom. The guide panel includes a peripheral portion and a panel support portion. The peripheral portion has opposing first and second side surfaces, and includes a first groove extending into the peripheral portion from the second side surface. The panel support portion extends from the second side surface away from the first side surface of the peripheral portion, and includes a second groove extending into the panel support portion from an inner surface of the panel support portion. The rear cover has a body and a hook that protrudes outwardly from the body, and the hook is positioned in the first groove of the peripheral portion of the guide panel. The cover bottom includes a first portion extend in a first direction, and a second portion extending in a second direction that is transverse to the first direction. The first portion is positioned on the rear cover. The second portion has an end surface positioned in the second groove of the panel support portion of the guide panel.

BRIEF DESCRIPTION OF THE SEVERAL VIEWS OF THE DRAWINGS

The accompanying drawings, that may be included to provide a further understanding of the disclosure and are incorporated in and constitute a part of this specification, illustrate embodiments of the disclosure and together with the description serve to explain various principles of the disclosure.

DETAILED DESCRIPTION

Reference will now be made in detail to embodiments of the disclosure, examples of which are illustrated in the accompanying drawings. Wherever possible, the same reference numbers will be used throughout the drawings to refer to the same or like parts. Detailed descriptions of known components, features, structures or the like will be omitted if a detailed description of such may otherwise mislead or obscure the embodiments of the disclosure. In the following embodiments, the same components are described in a first embodiment and description of such components may be omitted in the other embodiments.

The terms "first," "second," etc. may be used to describe various components, but the components are not limited by such terms. The terms are used only for the purpose of distinguishing one component from other components. For example, a first component may be designated as a second component, and vice versa, without departing from the scope of the present disclosure.

Figure 1:
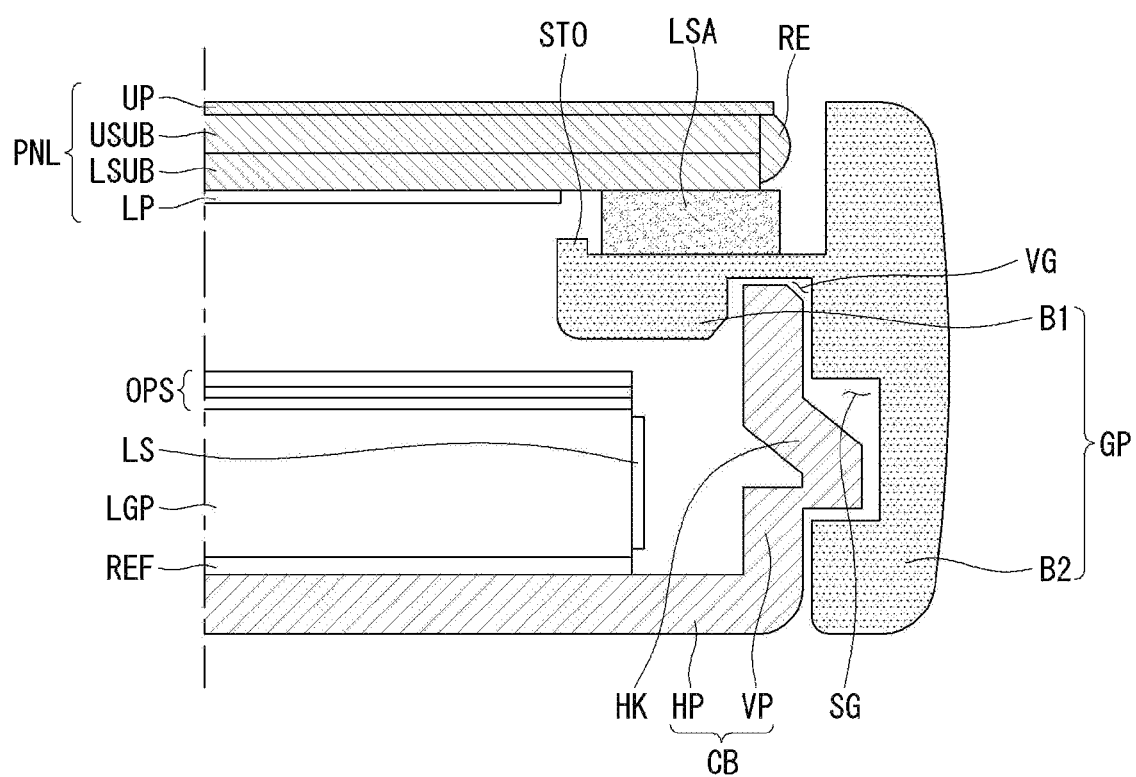
FIG. 1 is a cross-sectional view of a liquid crystal display according to an embodiment of the disclosure.

FIG. 1 is a cross-sectional view of a liquid crystal display according to an embodiment of the disclosure.

Referring to FIG. 1, a liquid crystal display according to an embodiment of the disclosure includes a liquid crystal display panel PNL and a backlight unit disposed under the liquid crystal display panel PNL. The liquid crystal display panel PNL includes an upper substrate USUB, a lower substrate LSUB, and a liquid crystal layer (not shown) between the upper substrate USUB and the lower substrate LSUB. The liquid crystal layer may be implemented in at least one of various liquid crystal modes.

Polarizing films UP and LP may be provided on a front surface and/or a back surface of the liquid crystal display panel PNL. The polarizing films UP and LP are provided on at least one of the front surface and the back surface of the liquid crystal display panel PNL to pass only components of a specific direction among components of light provided by the backlight unit. The terms "front," "frontward," "back" "rear," "rearward" and the like are used herein to indicate relative positions of various components. For example, a front surface of the liquid crystal display panel PNL may refer to an upper surface of the liquid crystal display panel PNL when oriented as shown in FIG. 1, while a back or rear surface may refer to a lower surface as shown in FIG. 1. Similarly, a "frontward" direction may refer to a direction extending upward or toward a "front" or upper portion of the liquid crystal display as oriented in FIG. 1, while a "rearward" direction may refer to a direction extending toward a "rear" or lower portion of the liquid crystal display as oriented in FIG. 1.

The liquid crystal display according to the embodiment of the disclosure may further include a sealing material RE covering the sides of the lower substrate LSUB and the upper substrate USUB that are disposed opposite each other, so as to protect the sides of the lower substrate LSUB and the upper substrate USUB and prevent a light leakage. The sealing material RE may be formed of a sealing resin including an oligomer, a monomer, a photoinitiator, additives, and the like. However, embodiments are not limited thereto.

The backlight unit is disposed under the liquid crystal display panel PNL and irradiates light onto the back surface of the liquid crystal display panel PNL. The backlight unit includes a light source LS, a light guide plate LGP, and at least one optical sheet OPS. Light, that is incident on a light incident surface of the light guide plate LGP from the light source LS, is converted into light of a surface light source and is emitted to a front surface of the light guide plate LGP. The light emitted to the light guide plate LGP is uniformly irradiated onto the back surface of the liquid crystal display panel PNL while passing through the optical sheet unit OPS positioned on the light guide plate LGP.

The light source LS may include one or more of lamps such as a light emitting diode (LED), a cold cathode fluorescent lamp (CCFL), and an external electrode fluorescent lamp (EEFL). The light source LS is positioned opposite at least one side (or the light incident surface) of the light guide plate LGP and irradiates light onto the side of the light guide plate LGP. The light guide plate LGP is a plate formed of a transparent material such as a transparent plastic, for example, polymethyl methacrylate (PMMA). The light guide plate LGP functions to convert light of a line light source or a point light source into light of a surface light source.

The optical sheet OPS includes one or more prism sheets and one or more diffuser sheets. The optical sheet OPS diffuses light incident from the light guide plate LGP and refracts a travel path of light at an angle substantially perpendicular to a light incident surface of the liquid crystal display panel PNL.

A reflective sheet REF is provided under the light guide plate LGP and increases efficiency of light incident on the liquid crystal display panel PNL by reflecting light provided from the light guide plate LGP. The reflective sheet REF may be attached to a cover bottom CB.

The liquid crystal display panel PNL and the backlight unit are assembled together by a case member such as the cover bottom CB and a guide panel GP to form a liquid crystal module LCM.

The cover bottom CB may be formed in a lying down "L" shape which has at least one bend in a cross-sectional view, as shown in FIG. 1. The cover bottom CB includes a first portion (which may be referred to herein as a horizontal portion HP) and a second portion (which may be referred to herein as a vertical portion VP). The horizontal portion HP is disposed to face a back surface of the backlight unit and cover the back surface of the backlight unit. The vertical portion VP is extended from the horizontal portion HP, is disposed opposite the side of the backlight unit, and covers the side of the backlight unit. The vertical portion VP is extended from one end of the horizontal portion HP in a frontward direction, e.g., in a direction extending toward a plane on which the liquid crystal display panel PNL is disposed. Namely, the vertical portion VP has a shape protruding from the horizontal portion HP in the frontward direction. The backlight unit including the light source LS, the light guide plate LGP, at least one optical sheet OPS, etc. is accommodated in an inner space provided by the horizontal portion HP and the vertical portion VP. Although the first portion and second portion of the cover bottom CB are described herein as a horizontal portion HP and a vertical portion VP, respectively, the terms "horizontal" and "vertical" are used only to indicate that the horizontal and vertical portions HP, VP extend in different directions. That is, the horizontal portion HP does not necessarily extend in a horizontal direction, and the vertical portion VP does not necessarily extend in a vertical direction. However, the horizontal portion HP and the vertical portion VP extend in different directions with respect to one another. In some embodiments, the horizontal portion HP and the vertical portion VP may extend in directions that are substantially orthogonal to each other, although embodiments provided herein are not limited thereto. For example, the horizontal portion HP may extend along a first direction, and the vertical portion VP may extend along a second direction that forms an angle with respect to the horizontal portion HP that is between about 80° and 100°, and in some embodiments, the angle between the horizontal and vertical portions HP, VP may be between about 85° and 95°.

The cover bottom CB may include a material having high thermal conductivity and high rigidity so as to smoothly or evenly dissipate heat from a driving circuit and the light source LS to the outside. For example, the cover bottom CB may be made of a metal material such as aluminum, aluminum nitride (AlN), electrolytic galvanized iron (EGI), stainless steel (SUS), galvalume steel coil (SGLC), aluminum coated steel (ALCOSTA), and steel plated tin (SPTE). Further, a high conductive material for accelerating the heat transfer may be coated on the metal material.

The guide panel GP may be formed in a "¬" shape which has at least one bend in a cross-sectional view, or at least one portion that extends in a direction that is different from at least one other portion, as shown in FIG. 1. This shape, broadly stated, could be considered an inverted and backward "L" shape. The guide panel GP includes a panel support portion (which may be referred to herein as a panel supporter B1) and a peripheral portion (which may be referred to herein as an extension B2). The extension B2 may form a periphery of the guide panel GP, which may surround or substantially surround side surfaces of the liquid crystal display panel PNL and the vertical portion VP of the cover bottom CB. The panel supporter B1 is provided between the liquid crystal display panel PNL and the backlight unit and supports an edge of the liquid crystal display panel PNL at a lower part of the liquid crystal display panel PNL. The panel supporter B1 is provided between the liquid crystal display panel PNL and the optical sheet OPS and uniformly maintains a distance between the liquid crystal display panel PNL and the optical sheet OPS. That is, the panel supporter B1 supports the liquid crystal display panel PNL at a position that is spaced apart from the optical sheet OPS by a uniform or substantially uniform distance. The extension B2 is extended from the panel supporter B1 and covers the vertical portion VP of the cover bottom CB at the outside of the cover bottom CB. The extension B2 is extended from one end of the panel supporter B1 in a rearward direction. Stated differently, the extension B2, which may form a peripheral portion of the guide panel GP, extends along a first direction, e.g., in a vertical direction as shown in FIG. 1. The panel supporter B1 extends from the extension B2 along a second direction that is transverse to the first direction, e.g., in a horizontal direction as shown in FIG. 1. The panel supporter B1 and the extension B2 may be integrally formed, for example, from a same piece of material. However, embodiments provided herein are not limited thereto, and in some embodiments, the panel supporter B1 and the extension B2 may be formed as separate pieces that are attached to one another by any suitable attachment mechanism.

The guide panel GP may have a rectangular frame shape with its center open. For example, the extension B2 may form a rectangular shaped periphery of the guide panel GP, and the panel supporter B1 may extend inwardly from the extension B2, with an open center of the guide panel GP being defined by inner edges of the panel supporter B1. The guide panel GP may be made of a plastic material that can be molded into a mold, for example, polycarbonate. The guide panel GP and the cover bottom CB may be fixed to each other using a fastening means such as a hook.

The guide panel GP and the cover bottom CB are fastened to each other by a hook method. The vertical portion VP of the cover bottom CB includes at least one hook HK protruding outwardly from a side of the vertical portion VP toward the extension B2 of the guide panel GP. The extension B2 of the guide panel GP includes at least one first groove SG into which the hook HK is inserted. The number of first grooves SG corresponds to the number of hooks HK.

The first groove SG may be a recess or an inner space formed by depressing a portion of an inner surface of the extension B2. The inner surface of the extension B2 refers to one surface of the extension B2 that is facing the vertical portion VP. The first groove SG is opened toward the hook HK of the vertical portion VP. That is, the first groove SG faces the hook HK, so that the hook HK may be positioned within the recess of the first groove SG. A thickness of a portion of the extension B2 including the first groove SG is different from a thickness of a portion of the extension B2 not including the first groove SG.

The liquid crystal display according to the embodiment of the disclosure further includes a second groove VG formed at the panel supporter B1 of the guide panel GP. In other words, the panel supporter B1 of the guide panel GP includes the second groove VG into which the vertical portion VP of the cover bottom CB is inserted. The second groove VG may be a recess or an inner space formed by depressing a portion of an inner surface of the panel supporter B1. The inner surface of the panel supporter B1 refers to one surface of the panel supporter B1 that is facing one end of the vertical portion VP, for example, the upper end surface of the vertical portion VP as shown. The second groove VG is opened in the rearward direction. That is, the recess of the second groove VG faces the end surface of the vertical portion VP of the guide plate GP, which may be in a rearward or downward direction as shown in FIG. 1. A thickness of a portion of the panel supporter B1 including the second groove VG is different from a thickness of a portion of the panel supporter B1 not including the second groove VG. The second groove VG is extended in one direction so that one end of the vertical portion VP is inserted into the second groove VG.

The vertical portion VP extended from the horizontal portion HP of the cover bottom CB in the frontward direction is guided to the inner space provided by the second groove VG. The liquid crystal display according to the embodiment of the disclosure can fasten more strongly the guide panel GP to the cover bottom CB by further including the second groove VG into which the vertical portion VP of the cover bottom CB is inserted. Namely, even when an external force is applied, the guide panel GP can be firmly fastened to the cover bottom CB without being detached from the cover bottom CB. In addition, the liquid crystal display according to the embodiment of the disclosure can prevent the components accommodated in the inner spaces between the guide panel GP and the cover bottom CB from being detached by strongly fastening the guide panel GP to the cover bottom CB.

The liquid crystal display panel PNL and the guide panel GP may be fixed to each other by an adhesive layer LSA. The adhesive layer LSA is disposed between a surface near the edge of the liquid crystal display panel PNL and a surface of the panel supporter B1 of the guide panel GP. The adhesive layer LSA can perform a function of restricting and restraining a mutual movement of the liquid crystal display panel PNL and the guide panel GP and a function of buffering an external force provided. Further, the adhesive layer LSA may include a light shielding material capable of preventing light from leaking to the edge of the liquid crystal display panel PNL, thereby serving as a light shielding member. The panel supporter B1 may further include a protrusion STO at its end, in order to prevent the adhesive layer LSA from being detached. The protrusion STO may have a shape protruding from the panel supporter B1 in the frontward direction, e.g., toward a lower surface of the liquid crystal display panel PNL as shown. The panel supporter B1 and the protrusion STO may be formed as one body. The adhesive layer LSA may be positioned between the extension B2 and the protrusion STO of the guide panel GP.

Embodiments of the disclosure do not need to cover the edges of the liquid crystal display panel PNL for the purpose of fixing the movement of the liquid crystal display panel PNL, and thus do not include a separate component such as a case top. Further, embodiments of the disclosure can remove or reduce a bezel area formed by the case top for blocking the edges of the liquid crystal display panel PNL. Thus, embodiments of the disclosure can provide lightweight and thin liquid crystal displays and achieve a narrow bezel. Further, embodiments of the disclosure do not need to perform an additional process for fastening the separate component such as the case top and thus can save process time and the process cost resulting from the additional process. In addition, embodiments of the disclosure can reduce process defects and remarkably improve the process yield.

When the case top is not provided, it may be possible for the liquid crystal display panel PNL to move in a lateral direction. Namely, when the case top is not provided, the fixing of the liquid crystal display panel PNL depends on an adhesive force of the adhesive layer LSA. Therefore, in some instances, the liquid crystal display panel PNL may not be fixed in place due to change in an external environment and may become detached. When the liquid crystal display panel PNL is not fixed in place and moves, the liquid crystal display panel PNL may be damaged by interference between the liquid crystal display panel PNL and other components, and optical characteristics of the liquid crystal display may change. Hence, the reliability of the liquid crystal display may be reduced. Thus, in order to satisfy both the aesthetics (e.g., lightweight and thin with a narrow bezel) and the reliability of the liquid crystal display, it is desirable to restrain and restrict the movement of the liquid crystal display panel PNL in the lateral direction while minimizing an area occupied by the bezel area.

To this end, the extension B2 according to the embodiment of the disclosure may be extended from one end of the panel supporter B1 in the frontward direction. That is, as shown in FIG. 1, the extension B2 includes a portion that extends frontwardly from the panel supporter B1, and a side surface of the extension B2 faces the side surface of the liquid crystal display panel PNL. The extension B2 supports the side of the liquid crystal display panel PNL and can restrain and restrict the movement of the liquid crystal display panel PNL in the lateral direction. Hence, the embodiment of the disclosure can provide a liquid crystal display capable of satisfying both the aesthetic and the product reliability. As shown in FIG. 1, the side surface of the extension B2 may be spaced apart from the side surface of the liquid crystal display panel PNL by some distance, which may allow for some small lateral movement of the liquid crystal display panel PNL; however, in some embodiments, the side surface of the extension B2 may be positioned directly adjacent or in contact with the side surface of the liquid crystal display panel PNL to more closely restrict lateral movement of the liquid crystal display panel PNL.

In order to achieve an extreme narrow bezel, the extension B2 of the guide panel GP may not protrude to the outside of the edge of the liquid crystal display panel PNL, or may protrude to the outside of the edge of the liquid crystal display panel PNL as small as possible when viewed from the front of the liquid crystal display.

As shown in FIG. 1, the guide panel GP and the cover bottom CB according to the embodiment of the disclosure are configured as appearance components and thus can perform the same function as a rear cover or a middle frame. More specifically, the appearance components may be the extension B2 of the guide panel GP and the horizontal portion HP of the cover bottom CB. Appearance components may be components that are exposed or otherwise visually perceptible in the final design of the liquid crystal display.

As described above, the cover bottom CB may include a material having high thermal conductivity and high rigidity, in order to efficiently dissipate heat generated inside the liquid crystal display and to secure predetermined rigidity for protecting the components inside the liquid crystal display. Namely, because the cover bottom functions as a heat dissipation structure, the cover bottom should be formed of a metal material. However, in this instance, the cover bottom has a difficulty in being formed in a freeform shape due to processing characteristics of the metal material. In order to increase a degree of freedom of shape design, a method may be considered to manufacture a cover bottom using a plastic material that can be molded into a mold. However, in this instance, a heat dissipation function of the cover bottom is not smoothly performed, and thus the product stability and reliability are remarkably reduced.

An application field of liquid crystal displays has recently expanded to televisions, car displays, wearable devices, etc. as well as mobile devices such as smart phones and tablet PCs. In order to easily apply the liquid crystal displays to the above described various fields, a sufficient degree of freedom of shape design of an appearance of the liquid crystal displays should be secured. Thus, the present disclosure provides a method to provide a liquid crystal display securing a predetermined degree of freedom of shape design of an appearance while achieving an extreme narrow bezel and a heat dissipation structure.

First Embodiment

Figure 2:
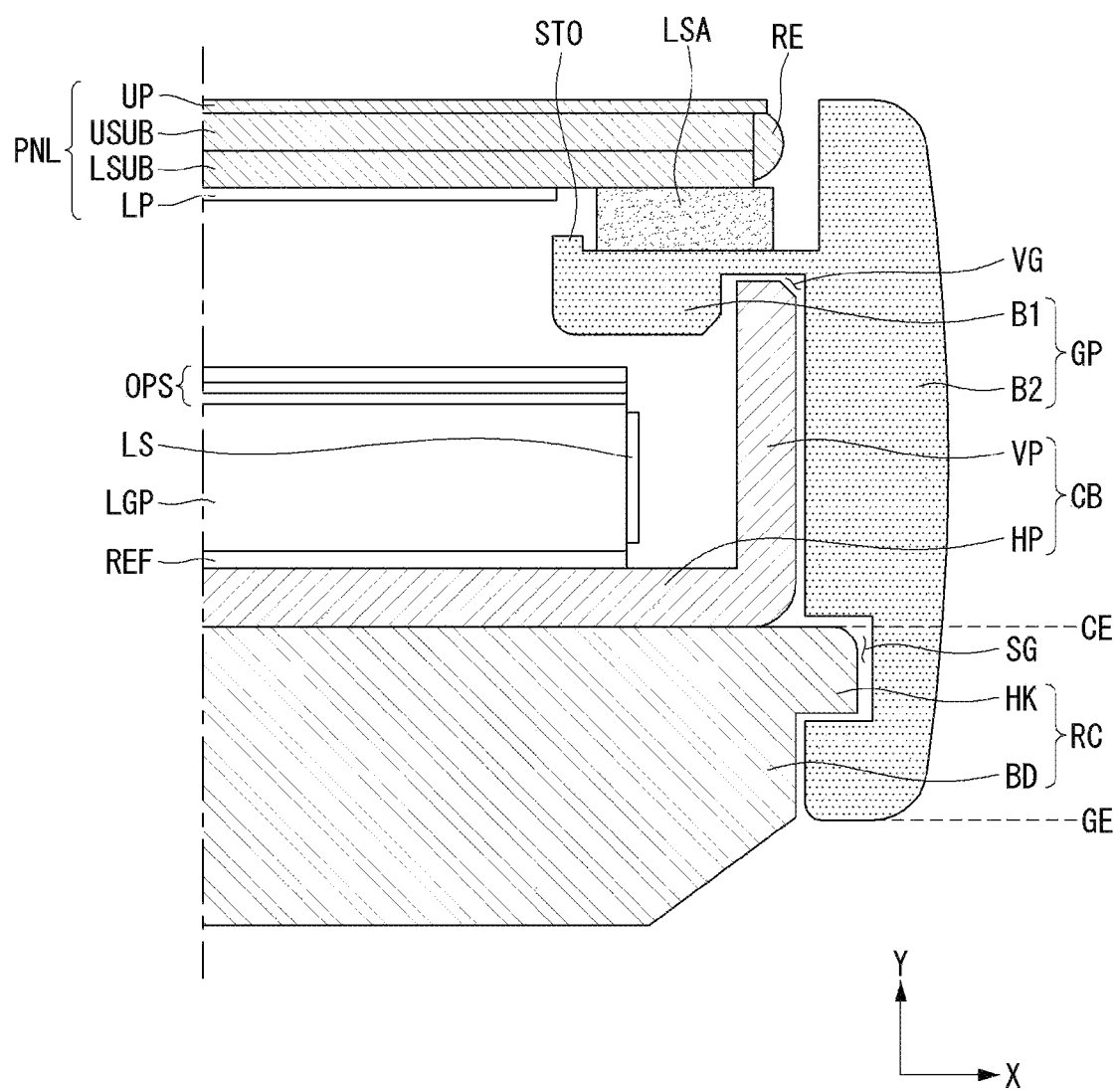
FIG. 2 is a cross-sectional view of a liquid crystal display according to a first embodiment of the disclosure.
Figure 3:
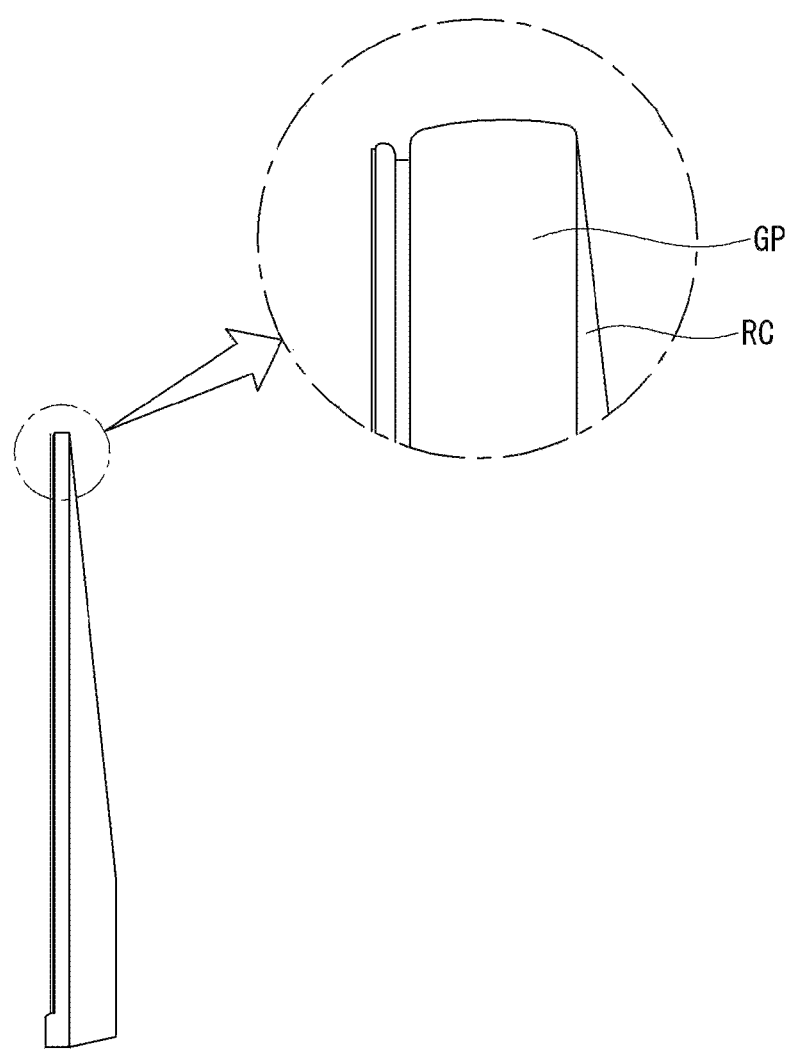
FIG. 3 is a side view illustrating an appearance of a liquid crystal display according to the first embodiment of the disclosure.

FIG. 2 is a cross-sectional view of a liquid crystal display according to a first embodiment of the disclosure. FIG. 3 illustrates an appearance of a liquid crystal display according to the first embodiment of the disclosure.

Referring to FIG. 2, a liquid crystal display according to a first embodiment of the disclosure includes a liquid crystal display panel PNL and a backlight unit disposed under the liquid crystal display panel PNL. The liquid crystal display panel PNL and the backlight unit are assembled together by a case member such as a cover bottom CB, a guide panel GP, and a rear cover RC to form a liquid crystal module LCM.

The cover bottom CB may be formed in an "L" shape which has at least one bend in a cross-sectional view. The cover bottom CB includes a first portion (i.e., horizontal portion HP) and a second portion (i.e., vertical portion VP). The horizontal portion HP is disposed to face a back surface of the backlight unit and cover the back surface of the backlight unit. The vertical portion VP is extended from the horizontal portion HP, is disposed opposite the side of the backlight unit, and covers the side of the backlight unit. The vertical portion VP is extended from one end of the horizontal portion HP in a frontward direction. Namely, the vertical portion VP has a shape protruding from the horizontal portion HP in the frontward direction. The backlight unit including a light source LS, a light guide plate LGP, at least one optical sheet OPS, etc. is accommodated in an inner space provided by the horizontal portion HP and the vertical portion VP.

The cover bottom CB may include a material having high thermal conductivity and high rigidity so as to smoothly or evenly dissipate heat from a driving circuit and the light source LS to the outside. For example, the cover bottom CB may be made of a metal material such as aluminum, aluminum nitride (AlN), electrolytic galvanized iron (EGI), stainless steel (SUS), galvalume steel coil (SGLC), aluminum coated steel (ALCOSTA), and steel plated tin (SPTE). Further, a high conductive material for accelerating the heat transfer may be coated on the metal material.

The guide panel GP may be formed in a "¬" shape which has at least one bend in a cross-sectional view, or at least one portion that extends in a direction that is different from at least one other portion, as shown in FIG. 2. The guide panel GP includes a panel supporter B1 and an extension B2. The extension B2 may form a periphery of the guide panel GP, which may surround or substantially surround side surfaces of the liquid crystal display panel PNL and the vertical portion VP of the cover bottom CB. The panel supporter B1 is provided between the liquid crystal display panel PNL and the backlight unit and supports an edge of the liquid crystal display panel PNL at a lower part of the liquid crystal display panel PNL. The panel supporter B1 is provided between the liquid crystal display panel PNL and the optical sheet OPS and uniformly maintains a distance between the liquid crystal display panel PNL and the optical sheet OPS. That is, the panel supporter B1 supports the liquid crystal display panel PNL at a position that is spaced apart from the optical sheet OPS by a uniform or substantially uniform distance. The extension B2 is extended from the panel supporter B1 and covers the vertical portion VP of the cover bottom CB at the outside of the cover bottom CB. The extension B2 is extended from one end of the panel supporter B1 in a rearward direction. Stated differently, the extension B2, which may form a peripheral portion of the guide panel GP, extends along a first direction, e.g., in a vertical direction as shown in FIG. 2. The panel supporter B1 extends from the extension B2 along a second direction that is transverse to the first direction, e.g., in a horizontal direction as shown in FIG. 2. The panel supporter B1 and the extension B2 may be integrally formed, for example, from a same piece of material. However, embodiments provided herein are not limited thereto, and in some embodiments, the panel supporter B1 and the extension B2 may be formed as separate pieces that are attached to one another by any suitable attachment mechanism. Because the extension B2 is configured as an appearance component unlike the panel supporter B1 and is exposed to the outside, the extension B2 should secure sufficient rigidity and prevent or reduce a reduction in the quality of an appearance resulting from defects in a manufacturing process. To this end, the extension B2 as the appearance component may have a thickness greater than the panel supporter B1.

The guide panel GP may have a rectangular frame shape with its center open. For example, the extension B2 may form a rectangular shaped periphery of the guide panel GP, and the panel supporter B1 may extend inwardly from the extension B2, with an open center of the guide panel GP being defined by inner edges of the panel supporter B1. The guide panel GP may be made of a plastic material that can be molded into a mold, for example, polycarbonate. The guide panel GP and the cover bottom CB can be fixed to each other using a fastening means such as a hook.

The rear cover RC includes a body BD that is disposed to face the horizontal portion HP of the cover bottom CB and cover the back surface of the backlight unit. The rear cover RC may be made of a plastic material that can be molded into a mold, for example, polycarbonate. Thus, the rear cover RC may be formed in various shapes, if necessary or desired. As a result, the rear cover RC can greatly increase a degree of freedom of shape design.

The fixing or fastening between the guide panel GP and the rear cover RC and the fixing between the guide panel GP and the cover bottom CB may be performed using a fastening means such as a hook.

More specifically, the guide panel GP and the rear cover RC are fastened to each other in the rearward direction by a hook method. Because the rear cover RC fastened to the guide panel GP supports the cover bottom CB at a back surface of the cover bottom CB, the rear cover RC can stably accommodate the cover bottom CB positioned inside the liquid crystal display.

The rear cover RC includes at least one hook HK protruding outwardly from a side of the body BD toward the extension B2 of the guide panel GP. The extension B2 of the guide panel GP includes at least one first groove SG into which the hook HK is inserted. The hook HK may be inserted into the first groove SG and coupled with the first groove SG. That is, the body BD may be coupled to the guide panel GP by positioning the hook HK in the first groove SG of the guide panel GP. A plurality of hooks HK may be provided, and the adjacent hooks HK may be spaced from each other by a predetermined distance. The predetermined distance may be properly selected, if necessary or desired. The number of first grooves SG corresponds to the number of hooks HK.

The first groove SG may be a recess or an inner space formed by depressing a portion of an inner surface of the extension B2. The inner surface of the extension B2 refers to one surface of the extension B2 that is facing the rear cover RC and the vertical portion VP. The first groove SG is opened toward the hook HK of the rear cover RC. That is, the first groove SG faces the hook HK, so that the hook HK may be positioned within the recess of the first groove SG. A thickness of a portion of the extension B2 including the first groove SG is different from a thickness of a portion of the extension B2 not including the first groove SG. Namely, because the first groove SG does not completely penetrate the extension B2 of the guide panel GP, the extension B2 even in an area where the first groove SG is formed has a predetermined thickness.

Although not shown, the fixing between the rear cover RC and the cover bottom CB and/or the fixing between the guide panel GP and the rear cover RC in an area where there is no hook HK may be performed using an adhesive member. The adhesive member may be a double-sided tape. However, embodiments are not limited thereto.

The guide panel GP and the cover bottom CB are fastened to each other by a hook method. The panel supporter B1 of the guide panel GP includes a second groove VG into which the vertical portion VP of the cover bottom CB is inserted. The second groove VG may be a recess or an inner space formed by depressing a portion of an inner surface of the panel supporter B1. The inner surface of the panel supporter B1 refers to one surface of the panel supporter B1 that is facing one end of the vertical portion VP. The second groove VG is opened in the rearward direction. That is, the second groove VG faces an end surface of the vertical portion VP, so that the end of the vertical portion VP may be positioned within the recess of the second groove VG. A thickness of the panel supporter B1 including the second groove VG is different from a thickness of the panel supporter B1 not including the second groove VG. The second groove VG is extended in one direction so that one end of the vertical portion VP is inserted into the second groove VG by a predetermined thickness. The vertical portion VP extended from the horizontal portion HP of the cover bottom CB in the frontward direction is guided to the inner space provided by the second groove VG.

The second groove VG does not completely penetrate the panel supporter B1. Namely, because the second groove VG does not completely penetrate the panel supporter B1 of the guide panel GP, the panel supporter B1 even in an area where the second groove VG is formed has a predetermined thickness. Because the guide panel GP according to the embodiment of the disclosure is configured as an appearance component, light from the light source LS may be emitted to the outside through the second groove VG, for example, if the second groove VG is configured to completely penetrate the panel supporter B1. Namely, the second groove VG penetrating the panel supporter B1 may be a moving path of light from the light source LS and may act as a factor causing a light leakage. Further, the second groove VG completely penetrating the panel supporter B1 may cause various problems including the penetration of foreign matter from the outside through the second groove VG, and the like. Thus, the second groove VG according to the embodiment of the disclosure is configured not to completely penetrate the panel supporter B1.

A movement of the cover bottom CB in the frontward direction or the rearward direction may be restricted by the panel supporter B1 of the guide panel GP and the rear cover RC. Further, a movement of the cover bottom CB in a lateral direction may restricted by the second groove VG. A movement of the rear cover RC in the frontward direction or the rearward direction may be restricted by the first groove SG.

In other words, the first groove SG is formed in the extension B2 of the guide panel GP. The extension B2 of the guide panel GP is extended in a second direction (e.g., a Y-axis direction). The first groove SG may be formed by depressing a portion of the inner surface of the extension B2 in a first direction (e.g., an X-axis direction). The second groove VG is formed in the panel supporter B1 of the guide panel GP. The panel supporter B1 of the guide panel GP is extended in the first direction. The second groove VG may be formed by depressing a portion of the inner surface of the panel supporter B1 in the second direction.

One end of the vertical portion VP extended in the second direction is inserted into the second groove VG of the guide panel GP, and thus the movement of the cover bottom CB in the first direction is restricted or fixed. The hook HK of the rear cover RC protruding in the first direction is inserted into the first groove SG of the guide panel GP, and thus the movement of the rear cover RC in the second direction is fixed. Further, the movement of the cover bottom CB in the second direction is fixed by the rear cover RC and the panel supporter B1 of the guide panel GP.

The liquid crystal display according to the first embodiment of the disclosure fastens both the cover bottom CB and the rear cover RC, that are stacked on each other, using one guide panel GP. To this end, one end GE of the extension B2 protrudes more than a back surface CE of the horizontal portion HP in the rearward direction. The first groove SG may be formed in a protruding portion of the extension B2. That is, the first groove SG may be formed in a portion of the extension B2 that extends beyond the back surface CE of the horizontal portion HP in the rearward direction.

In the structure illustrated in FIG. 1, because both the cover bottom CB and the guide panel GP are configured as the appearance components, the structure illustrated in FIG. 1 itself is used in the distribution process. Thus, the extension B2 of the guide panel GP should not protrude more than the horizontal portion HP of the cover bottom CB in the rearward direction, in order to prevent an interference with other components. For this reason, the liquid crystal display according to the first embodiment of the disclosure has a different structure from the structure illustrated in FIG. 1.

Because the guide panel GP and the rear cover RC are fixed to each other using one guide panel GP, the case members can keep the more stable fastening. Hence, even when an external force is applied, the guide panel GP, the cover bottom CB, and the rear cover RC can keep the strong fastening without being detached from one another. Further, because the guide panel GP, the cover bottom CB, and the rear cover RC keep the strong fastening, the cover bottom CB and the components accommodated in the inner spaces of the guide panel GP can be prevented from moving or being detached.

Referring to FIG. 3, the guide panel GP and the rear cover RC according to the embodiment of the disclosure are configured as the appearance components. Because the guide panel GP and the rear cover RC configured as the appearance components are made of a material like plastic, their appearance can be freely designed and modified. Thus, the liquid crystal display according to the embodiment of the disclosure secures a degree of freedom of shape design, and thus can be easily applied to various devices including televisions, car displays, wearable devices, etc. as well as mobile devices such as smart phones and tablet PCs. In addition, embodiments of the disclosure can provide a liquid crystal display securing a predetermined degree of freedom of shape design of an appearance while achieving an extreme narrow bezel and a heat dissipation structure.

Figure 4:
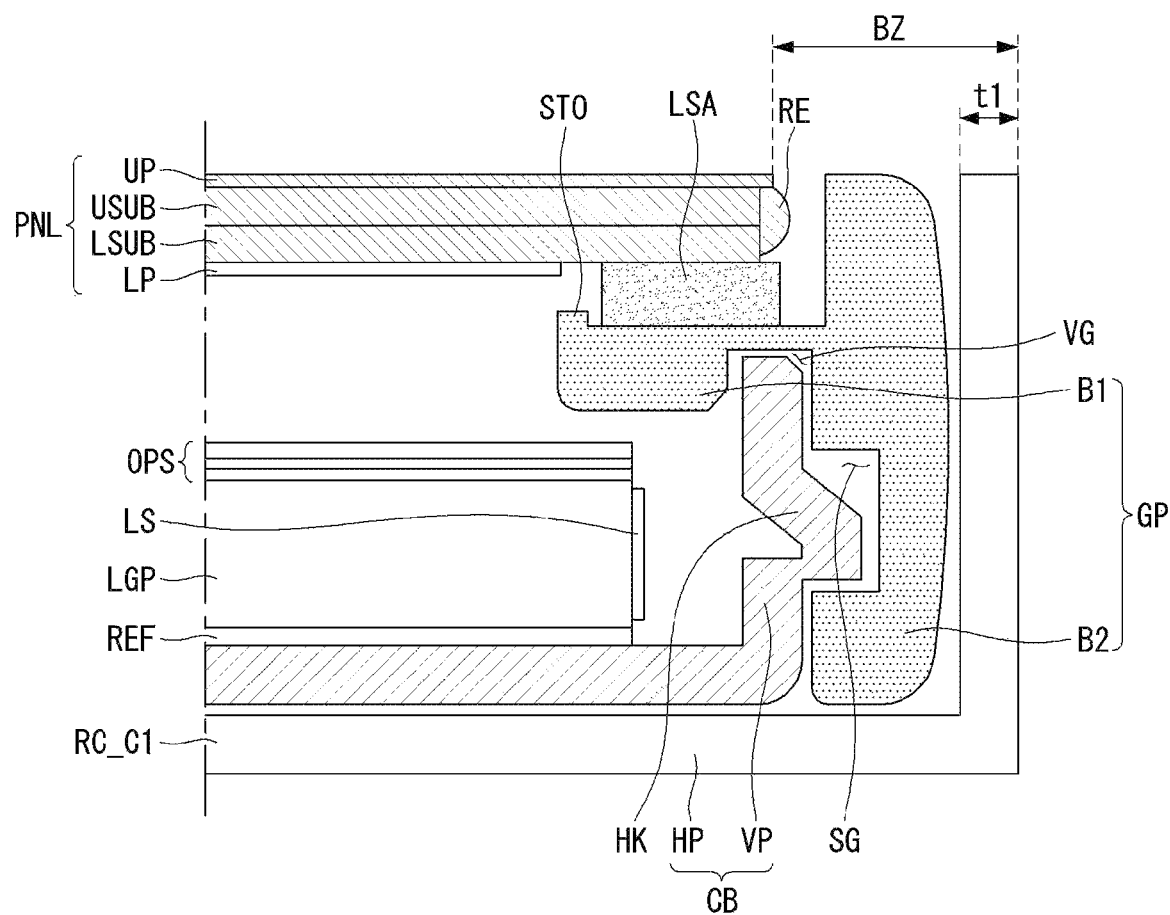
FIG. 4 illustrates a liquid crystal display according to a first comparative example, for comparison with the liquid crystal display according to the first embodiment of the disclosure.

FIG. 4 illustrates a comparison of a liquid crystal display according to a first comparative example and a liquid crystal display according to the first embodiment of the disclosure.

Referring to FIG. 4, a liquid crystal display according to a first comparative example includes a rear cover RC_C1. The rear cover RC_C1 according to the first comparative example is disposed to cover an outer surface of a guide panel GP while covering an outer surface (or a back surface) of a cover bottom CB. In this instance, an area of a bezel BZ increases by a thickness t1 of the rear cover RC_C1, as compared with the first embodiment of the disclosure. Thus, the liquid crystal display according to the first comparative example is different from the liquid crystal display according to the first embodiment of the disclosure, in that the guide panel GP is not configured as an appearance component, and thus it is difficult to achieve an extreme narrow bezel.

Figure 5:
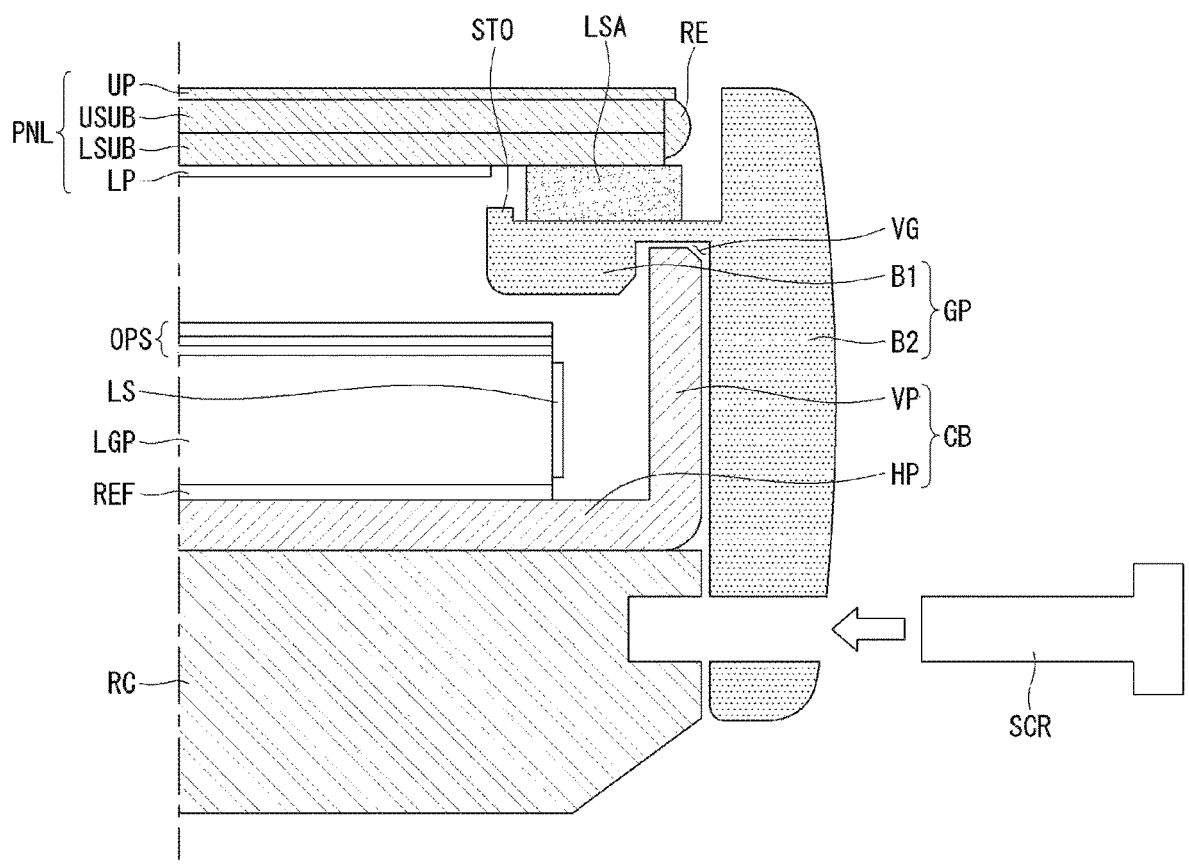
FIG. 5 illustrates a liquid crystal display according to a second comparative example, for comparison with the liquid crystal display according to the first embodiment of the disclosure.

FIG. 5 illustrates a comparison of a liquid crystal display according to a second comparative example, for comparison with the liquid crystal display according to the first embodiment of the disclosure.

Referring to FIG. 5, a liquid crystal display according to a second comparative example includes a guide panel GP and a rear cover RC configured as appearance components. The guide panel GP and the rear cover RC may be fastened to each other using a screw SCR. In this instance, because an additional process using the screw SCR is used in addition to a fastening structure using a hook, the manufacturing time and cost increase, and a defect rate may increase due to an increase in the number of manufacturing processes, as compared with the liquid crystal display according to the first embodiment. In the structure in which the guide panel GP is configured as the appearance component, because the screw SCR is exposed to the outside and may be perceived from the outside, aesthetics of the liquid crystal display according to the second comparative example may be significantly reduced. Further, the screw SCR protrudes to the outside and thus may cause an interference with other components. On the other hand, in the liquid crystal display according to the first embodiment of the disclosure, because the rear cover RC is fastened to the inside of the guide panel GP configured as the appearance component using the hook structure, the above-described problems do not occur.

Second Embodiment

Figure 6:
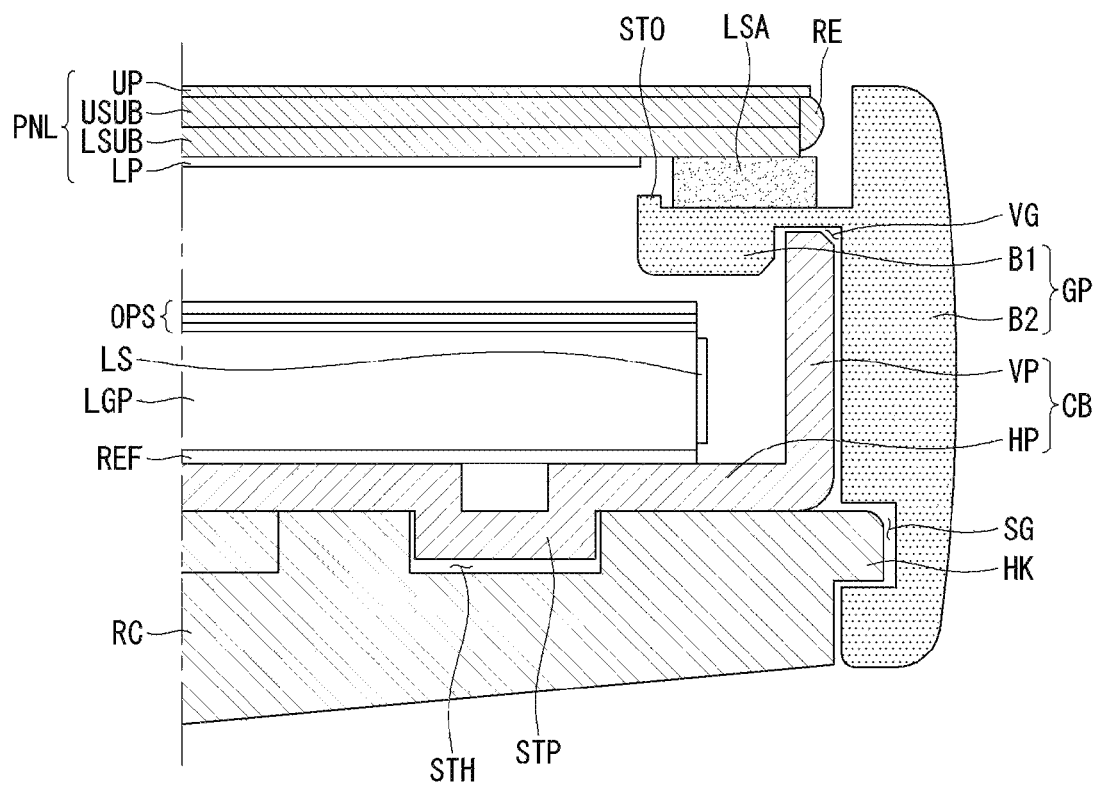
FIG. 6 is a cross-sectional view of a liquid crystal display according to a second embodiment of the disclosure.

FIG. 6 is a cross-sectional view of a liquid crystal display according to a second embodiment of the disclosure. Structures and components identical or equivalent to those illustrated in the first embodiment are omitted in the second embodiment.

Referring to FIG. 6, a liquid crystal display according to a second embodiment of the disclosure includes a liquid crystal display panel PNL and a backlight unit disposed under the liquid crystal display panel PNL. The liquid crystal display panel PNL and the backlight unit are assembled together by a case member such as a cover bottom CB, a guide panel GP, and a rear cover RC to form a liquid crystal module LCM.

The cover bottom CB according to the second embodiment of the disclosure further includes a stopper STP for restraining and restricting a movement of the rear cover RC. The stopper STP may be formed on a back surface of a horizontal portion HP of the cover bottom CB. The stopper STP has a shape protruding from the horizontal portion HP of the cover bottom CB in a rearward direction.

The rear cover RC includes a stopper groove STH into which the stopper STP is inserted. The stopper groove STH may be a recess or an inner space formed by depressing a portion of an inner surface of the rear cover RC. The inner surface of the rear cover RC refers to one surface of the rear cover RC that is facing the horizontal portion HP of the cover bottom CB. A plurality of stoppers STP may be provided, and the adjacent stoppers STP may be spaced from each other by a predetermined distance. The predetermined distance may be properly selected, if necessary or desired. The number of stopper grooves STH corresponds to the number of stoppers STP. The stopper STP may be inserted into the stopper groove STH and coupled with the stopper groove STH.

In other words, the horizontal portion HP of the cover bottom CB includes the stopper STP protruding toward the rear cover RC in a second direction. The rear cover RC includes the stopper groove STH. The stopper groove STH is formed by depressing a portion of the rear cover RC in the second direction, and the stopper STP is inserted into the stopper groove STH.

Because the liquid crystal display according to the second embodiment of the disclosure can restrain and restrict the movement of the rear cover RC using the stopper STP, the second embodiment of the disclosure can further strengthen the fastening between the rear cover RC and the cover bottom CB. Further, the second embodiment of the disclosure can prevent the rear cover RC from being detached from the guide panel GP by restricting the movement of the rear cover RC using the stopper STP. Hence, the second embodiment of the disclosure can strongly fasten the cover bottom CB, the guide panel GP, and the rear cover RC to one another and can secure stability and reliability of the product.

The stopper STP can guide a fastening position of the cover bottom CB and the rear cover RC. Thus, the second embodiment of the disclosure can fasten and fix the cover bottom CB to the rear cover RC in place and can greatly reduce process defects.

The embodiments of the disclosure include the guide panel configured as the appearance component and thus can provide the lightweight and thin liquid crystal display. The liquid crystal display according to the embodiments of the disclosure fastens both the cover bottom and the rear cover using one guide panel and thus can have the stronger fastening structure. Further, the embodiments of the disclosure form the guide panel and the rear cover configured as the appearance components using a material like plastic and thus can improve a degree of freedom of shape design of the liquid crystal display.

Although aspects have been described with reference to a number of illustrative aspects thereof, it should be understood that numerous other modifications and aspects can be devised by those skilled in the art that will fall within the scope of the principles of this disclosure. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

The various embodiments described above can be combined to provide further embodiments. These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The invention claimed is:

1. A liquid crystal display, comprising:
a guide panel configured to guide a position of a liquid crystal display panel and a backlight unit;
a cover bottom; and
a rear cover,
wherein the guide panel includes:
a panel supporter extended in a first direction, the panel supporter including a second groove formed by depressing a portion of an inner surface of the panel supporter in a second direction intersecting the first direction; and an extension extended from the panel supporter in the second direction, the extension including a first groove formed by depressing a portion of an inner surface of the extension in the first direction, wherein the cover bottom includes:

a horizontal portion extended in the first direction; and a vertical portion extended from the horizontal portion in the second direction, one end of the vertical portion being inserted into the second groove, wherein the rear cover includes:

a body covering a back surface of the horizontal portion of the cover bottom; and a hook protruding from the body in the first direction and inserted into the first groove, wherein the backlight unit includes a light source and a light guide plate, wherein the horizontal portion of the cover bottom is disposed to face an entire back surface of the backlight unit and cover the entire back surface of the backlight unit, wherein one end of the extension protrudes in a rearward direction beyond the back surface of the horizontal portion of the cover bottom, and wherein at least a portion of the first groove is disposed between a reference line extended from the back surface of the horizontal portion of the cover bottom in the first direction and a protruding end of the extension.

2. The liquid crystal display of claim 1, wherein the extension and the rear cover are configured as appearance components and are exposed to the outside, wherein the cover bottom is positioned on an inner surface of the rear cover.

3. The liquid crystal display of claim 1, wherein the rear cover is made of a plastic material.

4. The liquid crystal display of claim 1, wherein a portion of the panel supporter including the second groove has a predetermined thickness.

5. The liquid crystal display of claim 1, wherein a portion of the extension including the first groove has a predetermined thickness.

6. The liquid crystal display of claim 1, wherein the horizontal portion of the cover bottom includes a stopper protruding toward the rear cover in the second direction, wherein the rear cover further includes a stopper groove into which the stopper is inserted, the stopper groove being formed by depressing a portion of the rear cover in the second direction.

7. The liquid crystal display of claim 1, wherein the liquid crystal display panel is attached to the panel supporter.

8. The liquid crystal display of claim 7, further comprising an adhesive material between the liquid crystal display panel and the panel supporter.

9. The liquid crystal display of claim 8, wherein the panel supporter includes a protrusion portion that protrudes toward the liquid crystal display panel from a surface of the panel supporter, the adhesive material positioned between the protrusion portion of the panel supporter and the extension.

10. The display device of claim 1, wherein the hook of the rear cover is non-overlapping with the vertical portion of the cover bottom in the first direction.

11. A display device, comprising:

a guide panel, the guide panel including:

a peripheral portion having opposing first and second side surfaces, the peripheral portion including a first groove extending into the peripheral portion from the second side surface; and a panel support portion extending from the second side surface away from the first side surface of the peripheral portion, the panel support portion including a second groove extending into the panel support portion from an inner surface of the panel support portion, a rear cover having a body and a hook that protrudes outwardly from the body, the hook positioned in the first groove of the peripheral portion of the guide panel;

a cover bottom on the rear cover, the cover bottom including:

a first portion extending in a first direction, the first portion of the cover bottom positioned on the rear cover, and a second portion extending in a second direction, the second portion having an end surface position in the second groove of the panel support portion of the guide panel;

a backlight unit on the first portion of the cover bottom; and a display panel on the panel support portion of the guide panel, wherein the backlight unit includes a light source and a light guide plate, wherein the first portion of the cover bottom is disposed to face an entire back surface of the backlight unit and cover the entire back surface of the backlight unit, and wherein the body of the rear cover and the hook of the rear cover positioned in the first groove form a substantially planar surface.

12. The display device of claim 11, further comprising an adhesive material between the liquid crystal display panel and the panel support portion of the guide panel.

13. The display device of claim 12, wherein the panel support portion includes a protrusion that protrudes toward the liquid crystal display panel, the adhesive material positioned between the protrusion and the peripheral portion of the guide panel.

14. The display device of claim 13, wherein a side surface of the liquid crystal display panel is spaced apart from the peripheral portion of the guide panel.

15. The display device of claim 14, further comprising a sealing material on the side surface of the liquid crystal display panel.

16. The display device of claim 11, wherein the rear cover includes a plastic material.

17. The display device of claim 11, wherein the peripheral portion and the panel support portion of the guide panel are integrally formed of a same material.

18. The display device of claim 11, wherein the first portion of the cover bottom includes a stopper that extends outwardly from a surface of first portion, and the rear cover includes a stopper groove, the stopper being positioned in the stopper groove.

19. The display device of claim 11, wherein the hook of the rear cover is non-overlapping with the second portion of the cover bottom in the first direction.

* * * * *